(12) United States Patent
Keightley

(10) Patent No.: US 7,850,405 B2
(45) Date of Patent: Dec. 14, 2010

(54) HOLE SAW BOSS

(76) Inventor: Kym John Keightley, 5 Vincenzo Street, Fairview Park, South Australia (AU) 5126

( * ) Notice: Subject to any disclaimer, the term of this patent is extended or adjusted under 35 U.S.C. 154(b) by 0 days.

(21) Appl. No.: 10/551,096

(22) PCT Filed: Mar. 26, 2004

(86) PCT No.: PCT/AU2004/000376

§ 371 (c)(1), (2), (4) Date: Oct. 5, 2006

(87) PCT Pub. No.: WO2004/085104

PCT Pub. Date: Oct. 7, 2004

(65) Prior Publication Data

US 2007/0036620 A1 Feb. 15, 2007

(30) Foreign Application Priority Data

Mar. 28, 2003 (AU) ............................... 2003901440

(51) Int. Cl.
*B23B 51/05* (2006.01)
(52) U.S. Cl. .................. 408/204; 279/8; 408/239 R
(58) Field of Classification Search ............... 408/204, 408/703, 206, 207, 209, 239 R, 205, 208, 408/233, 238; 279/8, 143–145; 403/299; 409/232, 234

See application file for complete search history.

(56) References Cited

U.S. PATENT DOCUMENTS

| | | | | |
|---|---|---|---|---|
| 347,942 A * | 8/1886 | Leary | ............................... | 279/8 |
| 2,564,451 A * | 8/1951 | Sandberg et al. | ............. | 408/206 |
| 2,599,770 A * | 6/1952 | Marcerou | ..................... | 408/59 |
| 2,917,975 A * | 12/1959 | Webster | ......................... | 407/48 |
| 3,139,800 A * | 7/1964 | Clarkson et al. | .............. | 407/48 |
| 3,339,458 A * | 9/1967 | Williams | ..................... | 409/234 |
| 3,647,310 A * | 3/1972 | Morse | ..................... | 408/239 R |
| 3,784,316 A * | 1/1974 | Bittern | ........................ | 408/204 |
| 3,973,862 A * | 8/1976 | Segal | ........................... | 408/204 |
| 4,303,357 A * | 12/1981 | Makar | ........................ | 408/204 |

(Continued)

FOREIGN PATENT DOCUMENTS

DE   3532157 A1 *  3/1987

(Continued)

*Primary Examiner*—Daniel W Howell
(74) *Attorney, Agent, or Firm*—Bio Intellectual Property Services LLC; O. M. (Sam) Zaghmout

(57) ABSTRACT

The present invention relates to an improved hole saw boss (10) and in particular, to a boss including a threaded member (12) adapted to accommodate two hole saws of the same or different bore thread diameters. The present invention allows for a pre-existing aperture (22) in a work piece to be simply enlarged. This is useful if a new lock mechanism is being installed in a door with a pre-existing aperture where the lock mechanism requires a larger aperture than that which was in existence. Currently the aperture has to be enlarged by manual handwork since there is no centre-point to which a pilot drill may be enlarged. The threaded bore diameters of the present invention correspond with the commonly available hole saw threaded bore diameters. The present invention therefore provides the public with device for enlarging apertures which is simply, cost effective and can be used with currently available hole saws.

5 Claims, 7 Drawing Sheets

U.S. PATENT DOCUMENTS

| | | | | |
|---|---|---|---|---|
| 4,325,664 A * | 4/1982 | Mori | | 409/234 |
| 4,551,045 A * | 11/1985 | Bossler | | 408/206 |
| 4,946,189 A * | 8/1990 | Manning | | 180/349 |
| 4,968,189 A * | 11/1990 | Pidgeon | | 408/1 R |
| 5,035,550 A * | 7/1991 | Ajimi | | 408/204 |
| 5,108,235 A * | 4/1992 | Czyzewski | | 408/204 |
| 5,226,762 A * | 7/1993 | Ecker | | 408/204 |
| 5,352,071 A * | 10/1994 | Cochran et al. | | 408/204 |
| 5,413,437 A * | 5/1995 | Bristow | | 408/1 R |
| 5,624,213 A * | 4/1997 | Anderson | | 408/206 |
| 5,658,102 A * | 8/1997 | Gale | | 408/1 R |
| 5,868,532 A * | 2/1999 | Spenser | | 408/204 |
| 5,967,709 A * | 10/1999 | Thuesen | | 408/204 |
| 6,065,909 A * | 5/2000 | Cook | | 408/206 |
| 6,120,221 A * | 9/2000 | Alm | | 408/204 |
| 6,357,973 B2 * | 3/2002 | Chao | | 408/204 |
| 6,409,436 B1 * | 6/2002 | Despres | | 408/68 |
| 6,641,338 B2 * | 11/2003 | Despres | | 408/204 |
| 6,676,343 B2 * | 1/2004 | Burk | | 408/204 |
| 7,101,124 B2 * | 9/2006 | Keightley | | 408/204 |
| 7,104,738 B2 * | 9/2006 | Cantlon | | 408/204 |
| 2004/0086347 A1 * | 5/2004 | Steer | | 408/204 |
| 2007/0166116 A1 * | 7/2007 | Olson et al. | | 408/204 |
| 2008/0118315 A1 * | 5/2008 | Brunson | | 408/204 |

FOREIGN PATENT DOCUMENTS

| | | | |
|---|---|---|---|
| FR | 2587245 A1 * | 3/1987 | |
| JP | 10071517 A * | 3/1998 | |

* cited by examiner

HOLE SAW BOSS

The present invention relates to an improved hole saw boss and in particular, to a boss including a threaded member adapted to accommodate two hole saws of the same or different bore thread diameter.

BACKGROUND OF THE INVENTION

Drills are typically used by tradesmen and home handymen to perform a multitude of various tasks. The most common task is generally the drilling of holes into various materials. Drill bits are designed such that they are very effective in this process whereby the rapid rotation of the bit effectively cuts away at the work piece thereby forming an aperture. These drill bits, which are typically locked within a mandrel are effective for apertures of a small diameter, however, it is often required that much larger apertures be drilled.

This is where the invention of the hole saw came into being which incorporates a cylindrically shaped member including cutting teeth on one end and a threaded bore on the other. This threaded bore engages with an oppositely threaded member connected to the mandrel commonly referred to as a boss. The drill bit is incorporated into the hole saw assembly and protrudes through the boss a distance greater than that of the hole saw member so that it can be used to align the drill with the centre of the circle being cut. That is, when using a hole saw member to drill a hole into a work piece, it is much easier to align a pilot drill with a centre point of a circle than it is to align the cutting teeth of a hole saw member with the perimeter of a circle. The pilot drill forms an initial hole in the work piece until the hole saw teeth reach the material surface where they then proceed to accurately drill the required hole.

Although this has proven to be an effective method of drilling larger holes, it becomes apparent that when faced with having to increase the diameter of an existing hole, there exists no centre-point to which a pilot drill may be aligned. This provides a problem because as mentioned, it is very difficult to accurately drill a large-diameter hole without some type of centre alignment. In many situations, the handyman is forced to manually hand-work the work piece so that enlargement can be achieved.

It is an object of the present invention to overcome at least some of the aforementioned problems or to provide the public with a useful alternative.

Insofar as the applicant is aware, there exists no hole saw boss including a threaded member adapted to accommodate two hole saws of the same or different diameter threaded bore.

SUMMARY OF THE INVENTION

Therefore in a further form of the invention there is proposed an improved hole saw boss including:
a threaded member incorporating a first threaded portion adapted to engage a threaded bore of a first hole saw and
a second threaded portion adapted to engage a threaded bore of a second hole saw,
wherein the second threaded portion is of a stepped down diameter to accommodate a hole saw having a threaded bore diameter smaller than the first hole saw.

Preferably said first and second hole saws include cutting blades, the second hole saw cutting blade having a diameter smaller than said first hole saw cutting blade.

Preferably said boss includes a base member to which the threaded member is connected.

Preferably said first and second threaded portion diameters correspondingly engage with commonly available hole saw threaded bore diameters.

Preferably at least one threaded portion is of a length capable of accommodating more than one hole saw of different cutting diameters.

Preferably said base member and said threaded member include a central aperture adapted to allow a drill bit to fit there through.

Preferably said boss includes a connection means which is configured to engage a mandrel.

Preferably said second hole saw is chosen to fit snugly within an existing aperture of a work piece.

Preferably said first hole saw is adapted to drill a hole larger than the existing hole into said work piece.

Preferably the cutting blade of said second hole saw extends beyond the cutting blade of said first hole saw.

In yet a further form of the invention there is proposed an improved hole saw boss including:
a base member having at least one notch;
a first member extending outwardly from said base member and adapted to accommodate a threaded bore of a first hole saw, and a second threaded member extending outwardly from said first threaded member and adapted to accommodate a threaded bore of a second hole saw, said second threaded member being of a stepped down diameter to accommodate a hole saw having a threaded bore diameter smaller than the first hole saw; and
at least one drive pin, said drive pin configured to engage both a notch on said base member and an existing aperture on at least one of said hole saws, said drive pins configured to prevent over-tightening of said hole saws on the threaded members.

Preferably said drive pin is magnetised to restrain said drive pin within said aperture on said hole saw.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

Figure 1:
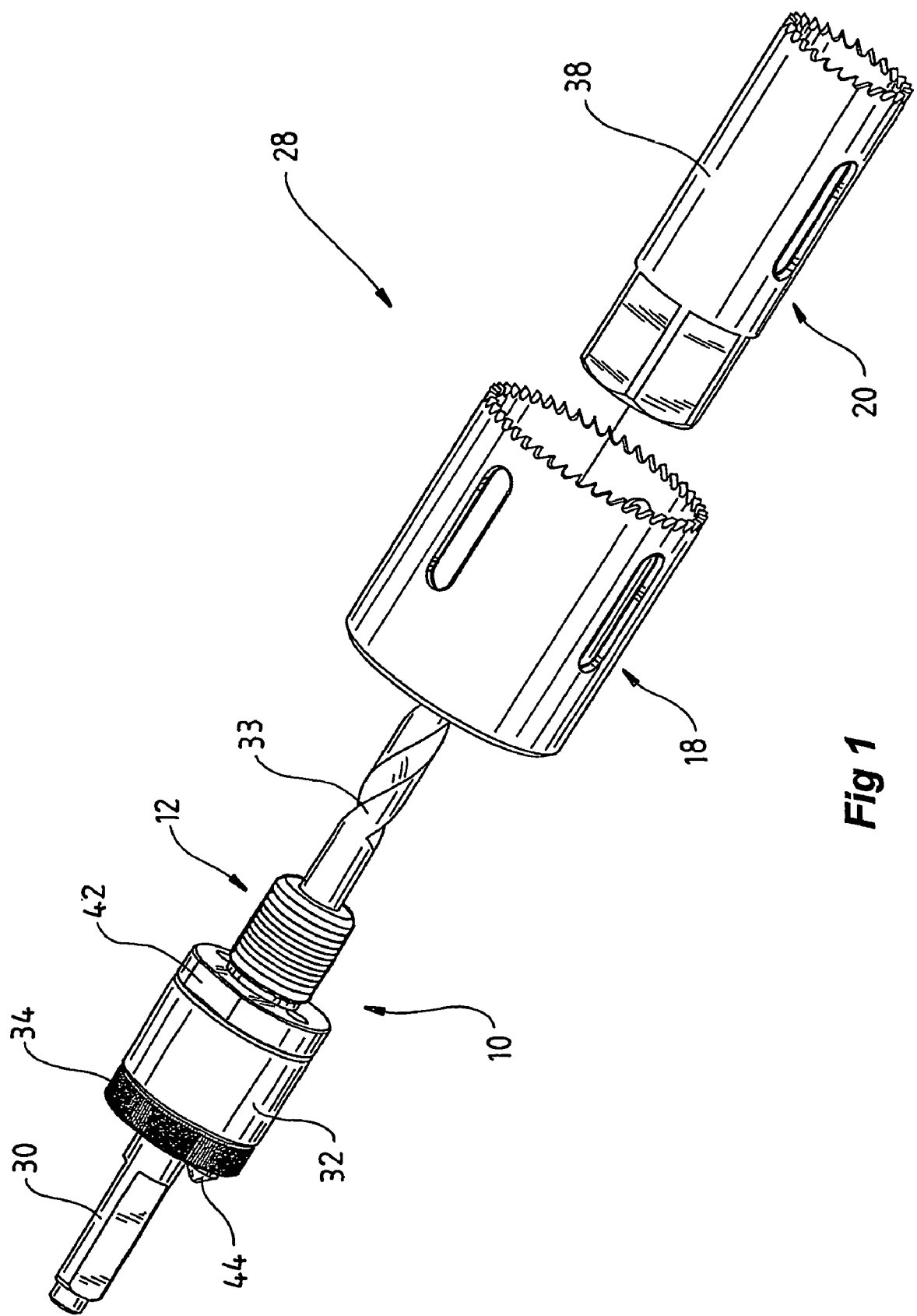
FIG. 1 is an exploded perspective view of a hole saw assembly embodying the present invention and including a single threaded member.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

The present invention discloses a hole saw boss 10 including a threaded member 12 adapted to accommodate two hole saws. Moreover, member 12 may be adapted to include a first threaded section 14 and a second threaded section 16 of stepped down diameter, an arrangement that allows for hole saws with differing bore thread diameters to be connected thereto. In both cases, threaded member 12 is adapted to engage both an outer hole saw 18 and an inner hole saw 20 respectively of different diameter cutting sizes. When the diametric enlargement of an existing aperture 22 in a work piece 24 is required, the inner hole saw 20 seeks to minimise any unfavourable lateral movement of the outer hole saw 18 during initial contact with the work piece surface 26, since it protrudes beyond the outer hole saw 18.

Figure 2:
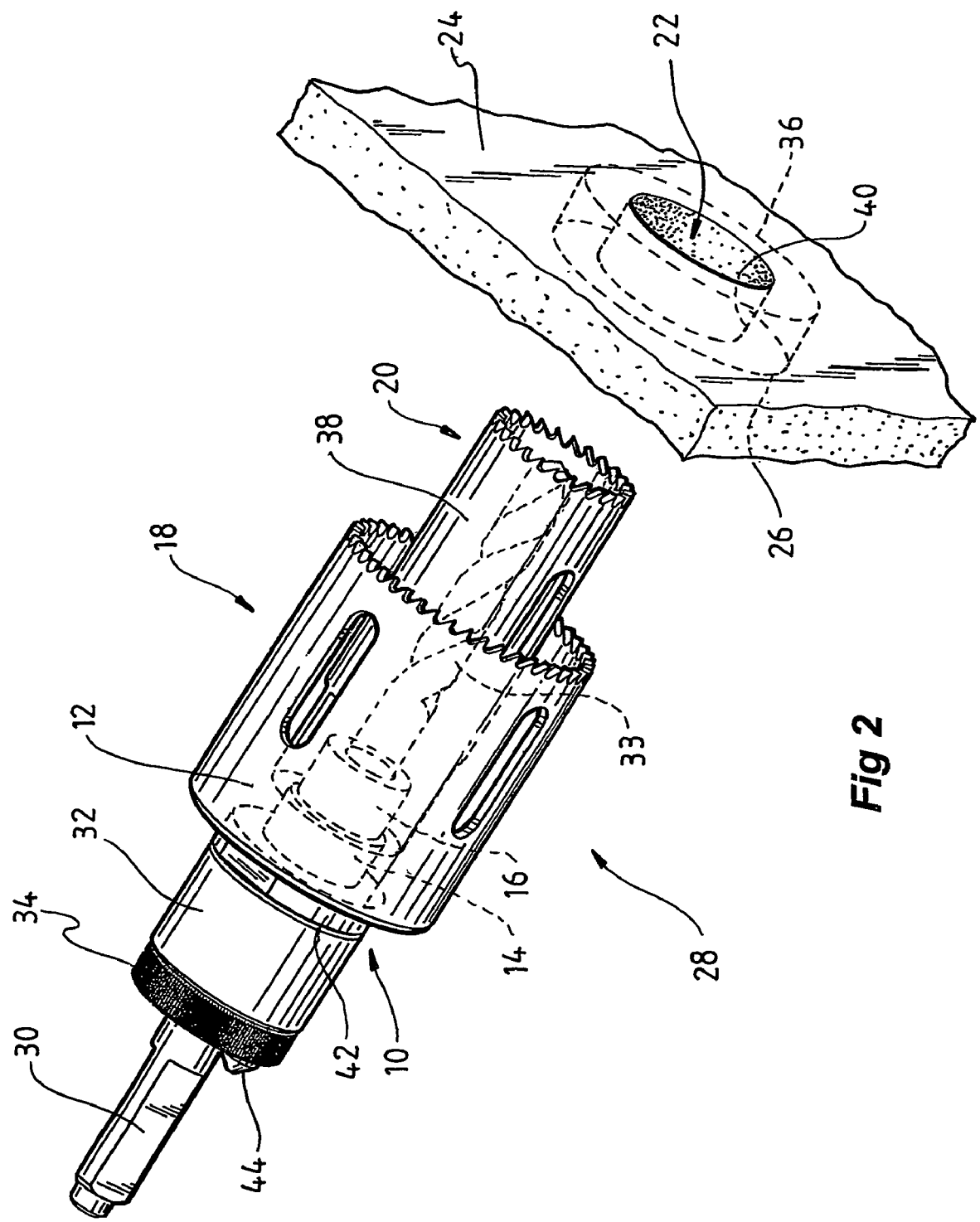
FIG. 2 is a perspective view of the hole saw assembly of FIG. 1 applied to a work piece.
Figure 4:
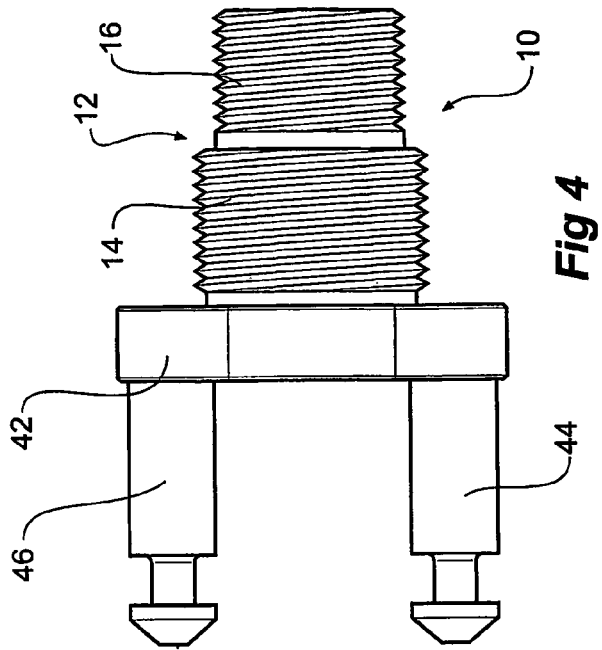
FIG. 4 is a side view of the hole saw boss of FIG. 3.
Figure 6:
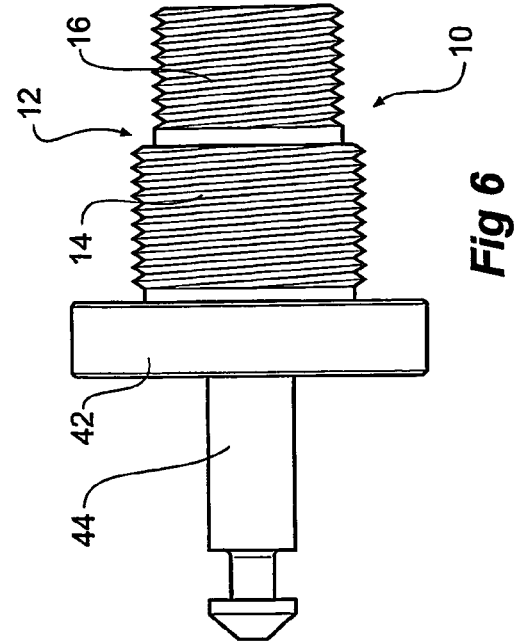
FIG. 6 is a side view of the hole saw boss rotated 90° to that shown in FIG. 4.
Figure 3:
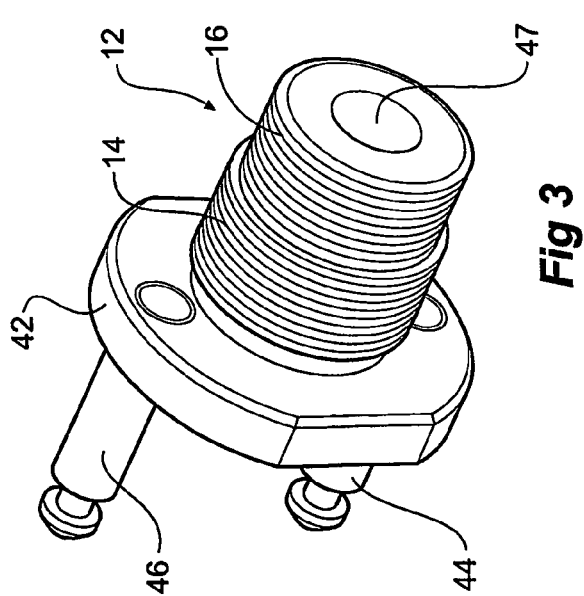
FIG. 3 is a perspective view of the double-diameter boss of the present invention including a mandrel connection means.
Figure 5:
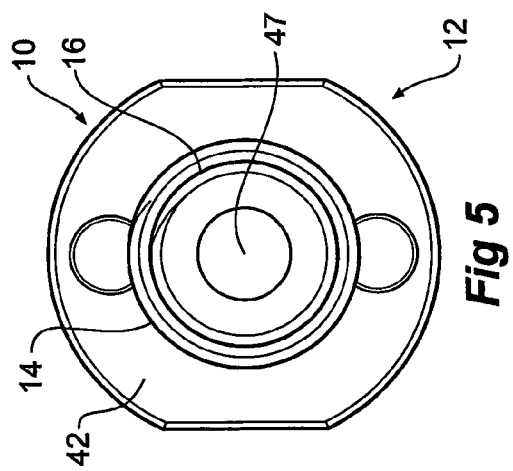
FIG. 5 is a top view of the hole saw boss of FIG. 3.

Illustrated in FIGS. 1 and 2 is a hole saw assembly utilising a hole saw boss the subject of the present invention. For details of the hole saw assembly the reader is referred to applicants International Patent Application PCT/AU02/01296 whose content is incorporated by reference herein.

FIG. 1 illustrates an exploded view of a hole saw assembly including the boss 10 of the present invention. The hole saw assembly 28 includes a shank 30, a mandrel 32 (or driving means), a drill bit 33, and an annulus 34 (or locking ring) that locks the boss 10 to the mandrel 32. FIGS. 2-6 illustrates the alternate configuration of boss 10 which can be incorporated into the same hole saw assembly 28. A work piece 24 includes an existing aperture 22 required to be enlarged while dotted line 36 forms an invisible circle perimeter to which enlargement of the aperture 22 is required to extend.

Using either configuration, the invention allows for a more accurate enlargement of the existing aperture 22 in that the inner hole saw 20 extends a greater distance longitudinally than the outer hole saw 18 and fits snugly within the aperture 22, thereby acting as a guide or pilot for the outer hole saw 18. It is the contact between the outer surface 38 of the inner hole saw cylinder with the inner surface 40 of the aperture 22 that minimises the risk of the outer hole saw 18 unfavourably moving as it makes contact with the work piece surface 26. If it were not for the inner hole saw 20, the rotating motion of the outer hole saw 18 would cause it to gyrate as soon as it makes contact with the work piece surface 26.

The first configuration of boss 10 shown in FIG. 1 simply includes a single diameter threaded member 12 to which firstly the outer 18 and secondly the inner 20 hole saw are screwed, the two hole saws being of different cutting diameter so that one can fit within the other.

Boss 10 of the second configuration shown in FIGS. 2-6 engages the outer hole saw 18 with a first threaded section 14. Longitudinally extending from the first threaded section 14 is a second threaded section 16 of stepped down diameter adapted to engage the inner hole saw 20. It is to be understood that in both configurations, the threaded section 14 is fixedly attached to a base member 42, which is adapted to fit to the mandrel 32 using connection means 44 and 46 locked by annulus 34. Furthermore, a central aperture 47 through boss 10 allows drill bit 33 to protrude there through.

The second configuration including a second threaded section 16 of stepped down diameter is provided to accommodate typical hole saws that engage with one of two boss thread sizes, a smaller thread size (typically ½") or a larger thread size (typically ⅝"). These cover a wide range of hole saw diameters from relatively small hole saws to larger hole saws. Preferably, the threaded sections 14 and 16 are shaped correspondingly to engage these industry standard threads, however, the boss of the invention should not be limited to these sizes as it could well be used for other functions incorporating thread sizes of a different magnitude. For example, the first threaded section 14 could be used to engage a buffing or grinding wheel (not shown) while the second threaded section 16 could be used to engage a locking bolt (not shown) or the like. Threaded sections for this operation may well differ from those used in a typical hole saw operation.

It is to be also understood that the connection means referred to in this invention need not limit the connection means used, for example, the boss 10 may simply be screwed onto the mandrel 32 whereby both mandrel 32 and base member 42 include engageable threads. Furthermore, any member adapted to be screwed may include flat surfaces adapted to be engaged by a spanner or the like for screwing and unscrewing of the member.

It should be further understood that the lengths of sections 14 and 16 of threaded member 12 are such that two different sized hole saws may well engage only one of the sections. This would occur, for example, when the diameter of the required enlargement perimeter 36 is only slightly larger than that of the existing aperture 22 and therefore hole saws of relatively similar sizes are used.

It should now be apparent to those skilled in the art that the use of either of the two configurations of the boss of the present invention in a hole saw assembly, allows the user of such an assembly, when faced with wanting to enlarge a hole on a work piece to simply reach into their toolbox, pick up two hole saws of the same or different size, screw them onto the boss and proceed with drilling. The invention does away with the need to manually enlarge a hole in a work piece. It further eliminates the need to replace the boss when a hole saw of differing bore size needs to be used and it achieves this by including different sized threads on the one boss.

Figure 7:
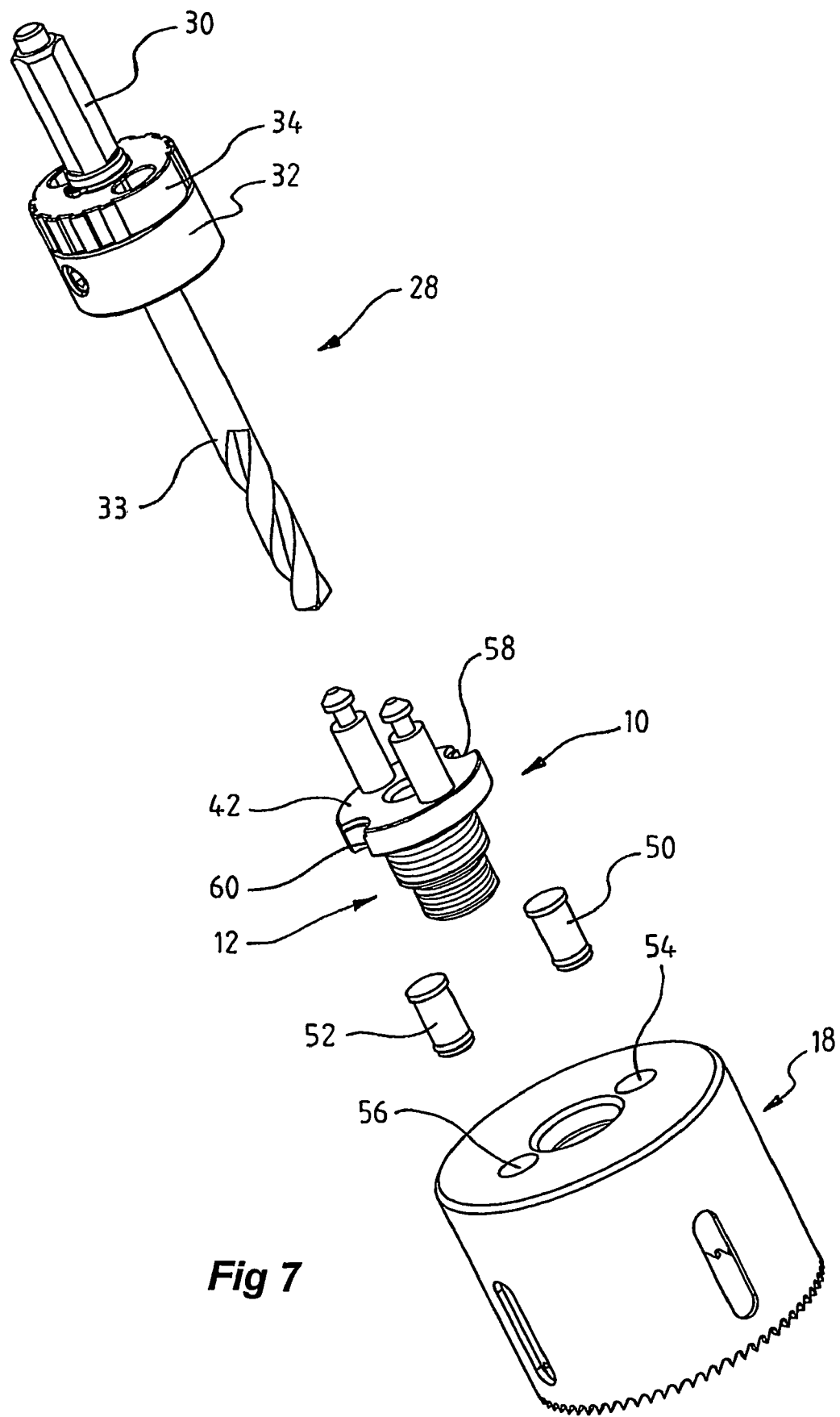
FIG. 7 is an exploded perspective view of a hole saw assembly embodying the present invention and including two drive pins.
Figure 8:
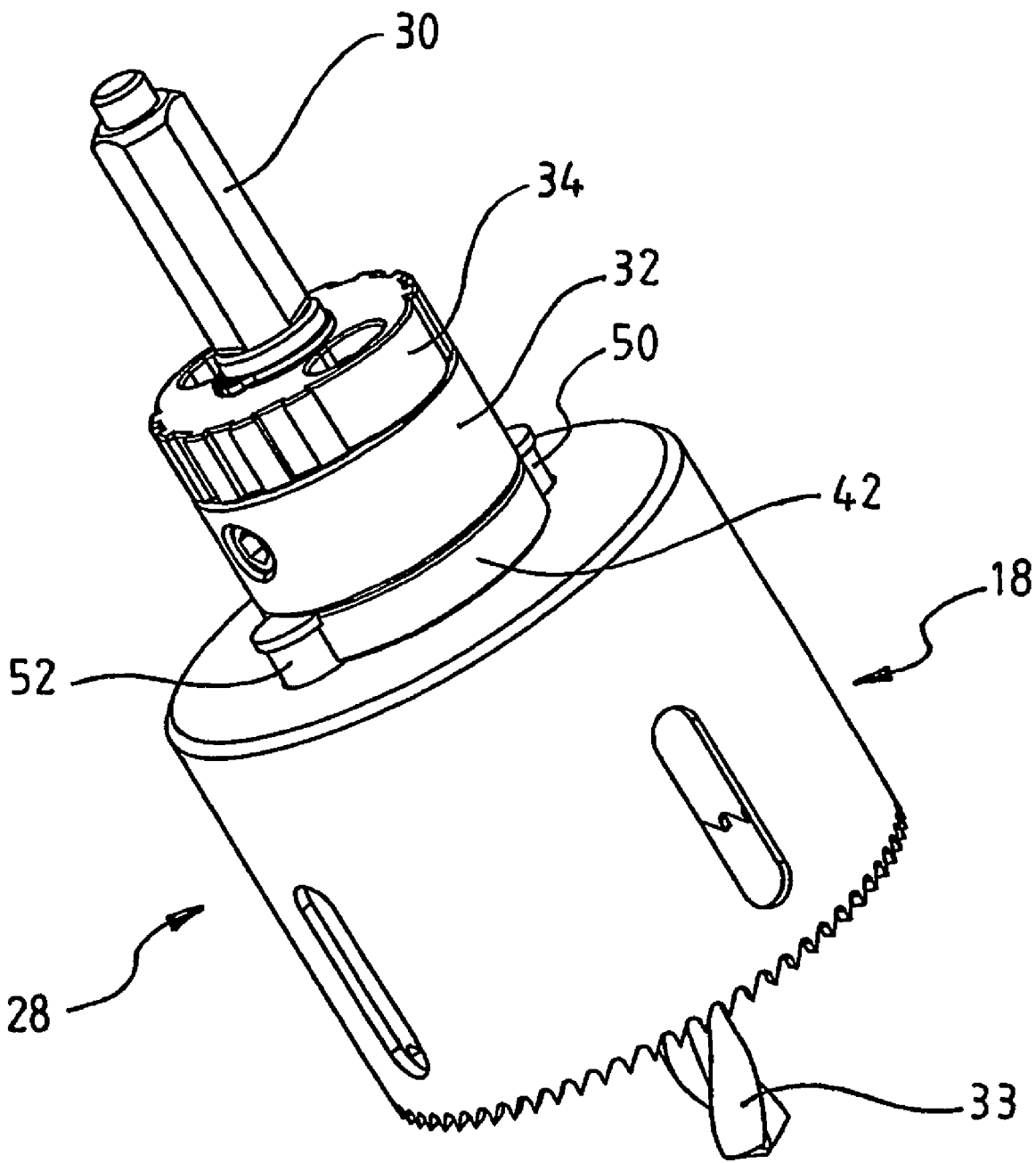
FIG. 8 is a perspective view of the hole saw boss of FIG. 7.

In a further embodiment the hole saw assembly 28 includes drive pins 50 and 52 as illustrated in FIG. 7. The drive pins 50 and 52 are configured to fit within the pre-existing apertures 54 and 56 of the hole saw 18. These pre-existing aperture 54 and 56 are a feature of all hole saws and are used to engage older hole saw mandrels. The drive pins 50 and 52 engage recesses 58 and 60 on the base member 42 respectively, as illustrated in FIG. 8. Alternately, a single drive pin could be used.

In this way the hole saw 18 is prevented from over tightening on the threaded member 12. Over tightening can occur when a large hole saw is used on machinery. If drive pines are not used the gears of the machinery can tighten the hole saw 18 onto the threaded member 12 is such as way that the hole saw 18 is difficult to remove from the threaded member 12. It is then necessary to remove the hole saw boss 10 from the machinery and forcibly disengage the hole saw 18. In some cases the thread of the threaded member 12 may even be stripped thereby damaging the hole saw boss 10. The drive pins 50 and 52 therefore bear the load and prevent the hole saw 18 tightening onto the boss 10. The risk of damage to the threaded member 12 is thereby reduced whilst ensuring that the hole saw 18 can be rapidly engaged and disengaged from the hole saw boss 10.

Figure 9:
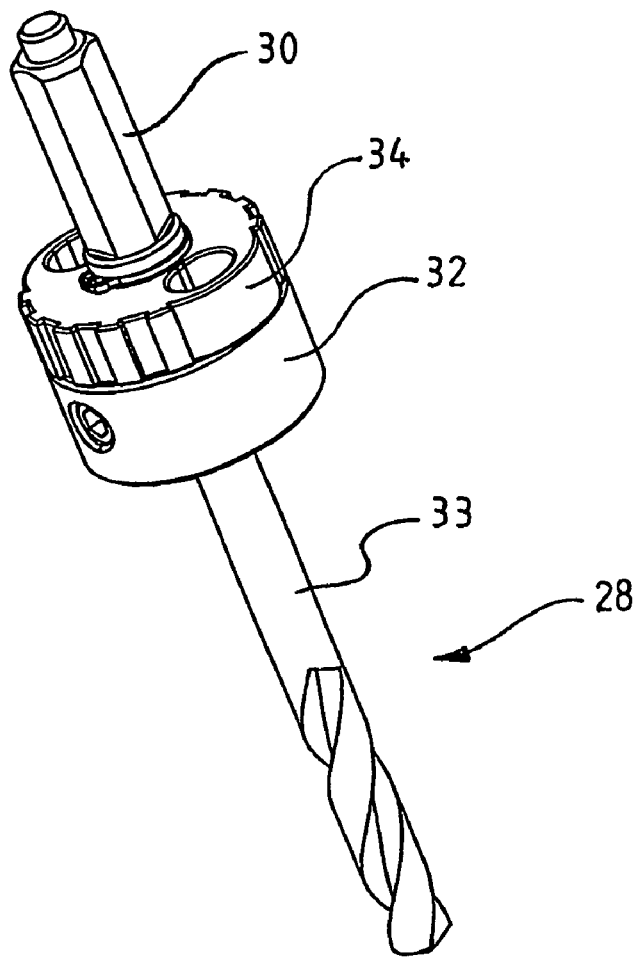
FIG. 9 is a perspective view of the hole saw boss of FIG. 7 illustrating the mandrel disengaged from the hole saw boss.
Figure 9:
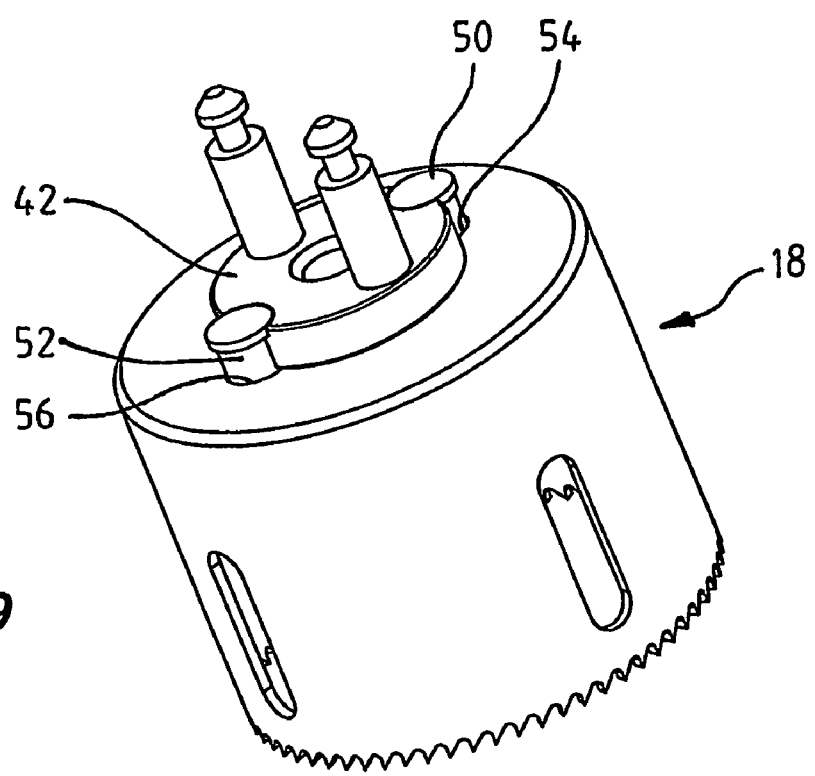

As further illustrated in FIG. 8, the drive pins 50 and 52 are held in place during operation of the hole saw assembly 28 by the mandrel 32. However, when the mandrel 32 is disengaged from the hole saw boss 12, as illustrated in FIG. 9, the drive pins 50 and 52 are no longer restrained within apertures 54 and 56. The drive pins 50 and 52 therefore have the potential to be lost during removal of the hole saw 18. Thus it may be desirable that the drive pins 50 and 52 are magnetised so they are restrained within the aperture 54 and 56 even when the mandrel 32 is disengaged. The reader should however appreciate that the present invention is not limited this particular configuration nor to the use of magnetised drive pins.

Figure 10:
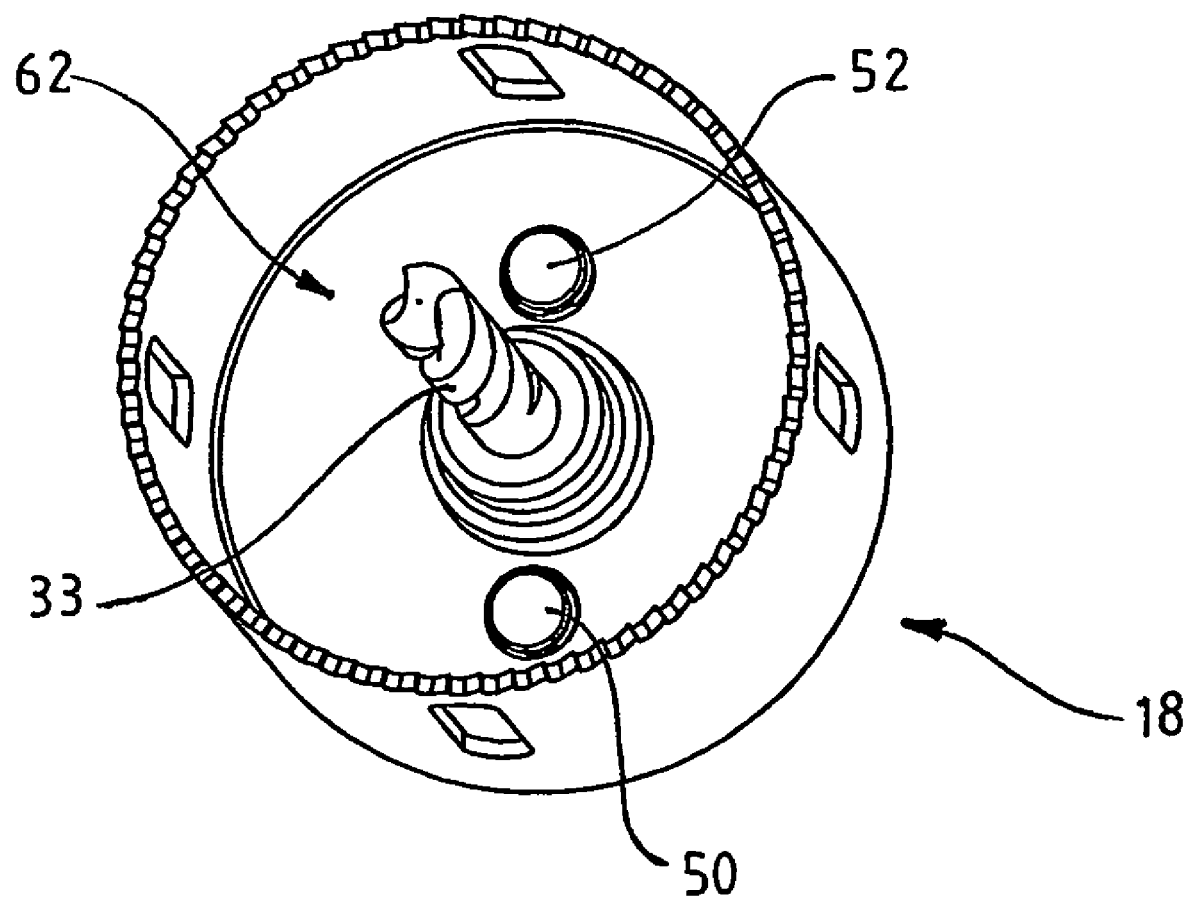
FIG. 10 is an end view of the hole saw boss of FIG. 7.

It is important that the drive pins 50 and 52 do not interfere with the operation of the hole saw assembly 28 if more than one hole saw is located on the threaded member 12. Therefore, as illustrated in FIG. 10 the drive pins engage the aperture 50 and 52 in such as way that they do not protrude excessively into the cavity 62 of the hole saw 18. This ensures that the ends of the drive pins 50 and 52 do not interfere if a second hole saw (not shown) is attached to the threaded member 12. Alternatively, the drive pins could be configured to engage both of the hole saws.

As the skilled addressee will now appreciated the embodiment that incorporates at least one drive pin allows the hole saw boss of the present invention to be used in conjunction with large hole saws on industrial machinery. The use of the drive pins prevents the hole saw 18 from being over tightened onto the boss or damaging the boss by stripping the thread.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

The invention claimed is:

1. An improved hole saw boss including:
   a base member having at least one notch;
   a first threaded member extending outwardly from said base member and adapted to accommodate a threaded bore of a first hole saw, and a second threaded member extending outwardly from said first threaded member and adapted to accommodate a threaded bore of a second hole saw, said second threaded member being of a stepped down diameter to accommodate a hole saw having a threaded bore diameter smaller than the first hole saw; and
   at least one drive pin, said drive pin configured to engage both said at least one notch on said base member and an existing aperture on at least one of said hole saws, said drive pins configured to prevent over-tightening of said hole saws on the threaded members.

2. An improved hole saw boss of claim 1 wherein said at least one drive pin is magnetised to restrain said drive pin within said aperture on said hole saw.

3. An improved hole saw boss of claim 1 wherein at least one threaded member is of a length capable of accommodating more than one hole saw of different cutting diameters.

4. An improved hole saw boss of claim 1 wherein said base member and said threaded member include a central aperture adapted to allow a drill bit to fit there through.

5. An improved hole saw boss of claim 1 wherein said boss includes a connection means which is configured to engage a mandrel.

* * * * *